United States Patent
Wildhagen

(10) Patent No.: US 7,362,872 B2
(45) Date of Patent: Apr. 22, 2008

(54) METHOD FOR NOISE REDUCTION OF A FM SIGNAL

(75) Inventor: Jens Wildhagen, Weinstadt (DE)

(73) Assignee: Sony Deutschland GmbH, Cologne (DE)

( * ) Notice: Subject to any disclaimer, the term of this patent is extended or adjusted under 35 U.S.C. 154(b) by 1153 days.

(21) Appl. No.: 10/225,849

(22) Filed: Aug. 22, 2002

(65) Prior Publication Data
US 2003/0039371 A1   Feb. 27, 2003

(30) Foreign Application Priority Data
Aug. 24, 2001   (EP) .................... 01 120 335

(51) Int. Cl.
*H03G 7/00* (2006.01)
(52) U.S. Cl. .................. 381/106; 381/13
(58) Field of Classification Search .......... 381/13, 381/94.1, 94.3, 106
See application file for complete search history.

(56) References Cited
U.S. PATENT DOCUMENTS
4,602,381 A    7/1986  Cugnini et al.
4,672,633 A    6/1987  Claasen et al.
4,752,955 A *  6/1988  Torick .................... 381/13

FOREIGN PATENT DOCUMENTS
DE          41 28 045         3/1993

OTHER PUBLICATIONS
"Improving the Signal-to-Noise Ration and Coverage of FM Sterophonic Broadcasts", J. Audio Enc. Soc., vol. 33, No. 12, New York, 1985 Dec. pp. 938-943.
"Linear Phase Compander for FM Broadcast", Aug. 24, 2001, pp. 1-25.

* cited by examiner

*Primary Examiner*—Stella L. Woo
(74) *Attorney, Agent, or Firm*—Oblon, Spivak, McClelland, Maier & Neustadt, P.C.

(57) ABSTRACT

A compander for noise reduction of a FM signal is described, wherein a group delay ($\tau$) linked to the generation of the compressor gain ($c_c(t)$) is equalised during generation of the multiplex signal ($m(t)$), and a group delay ($\tau$) linked to the generation of the expander gain ($c_e(t)$) is equalised during generation of the sum signal ($u_s(t)$) and the expanded difference signal ($u_e(t)$). Alternatively or additionally the compressor gain and/or the expander gain is controlled by an auxiliary signal on the basis of a combination of sum signal and difference signal of the FM signal. Such companders avoid overmodulation in the transmitter.

18 Claims, 2 Drawing Sheets

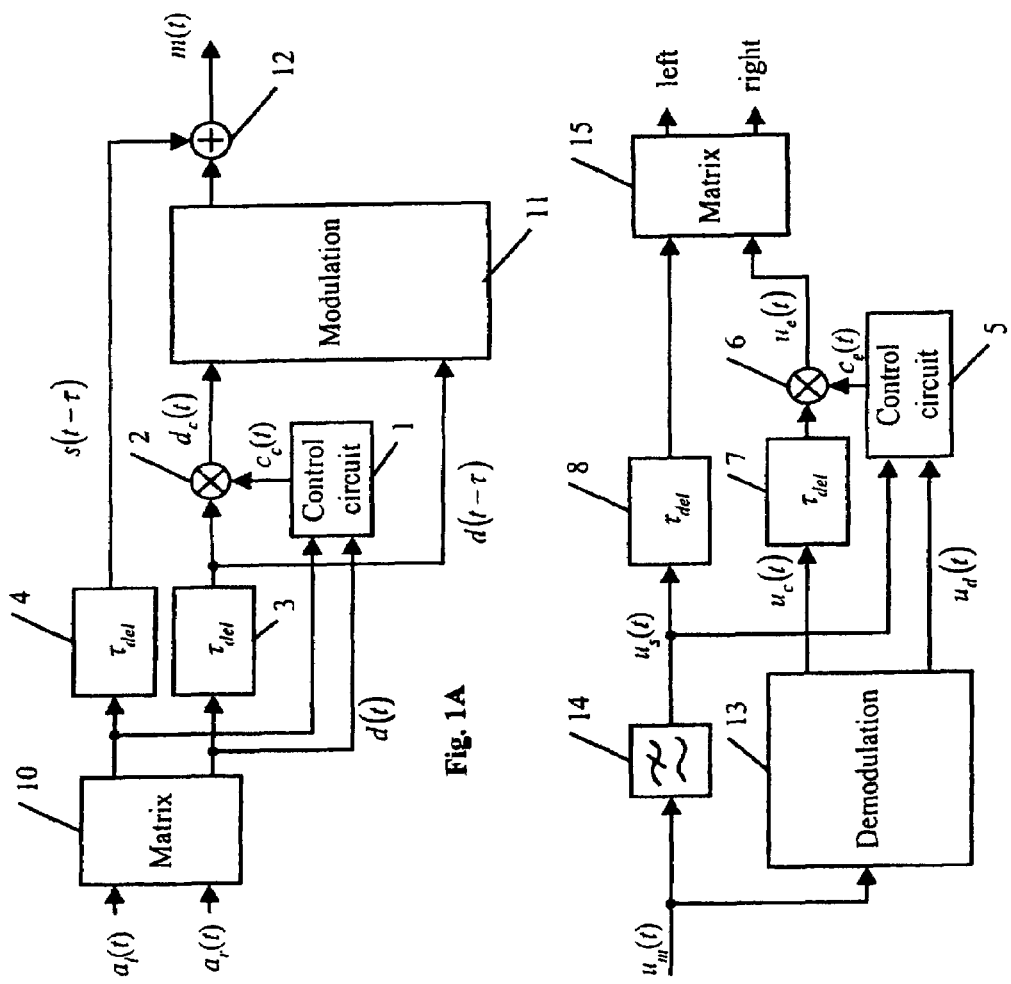

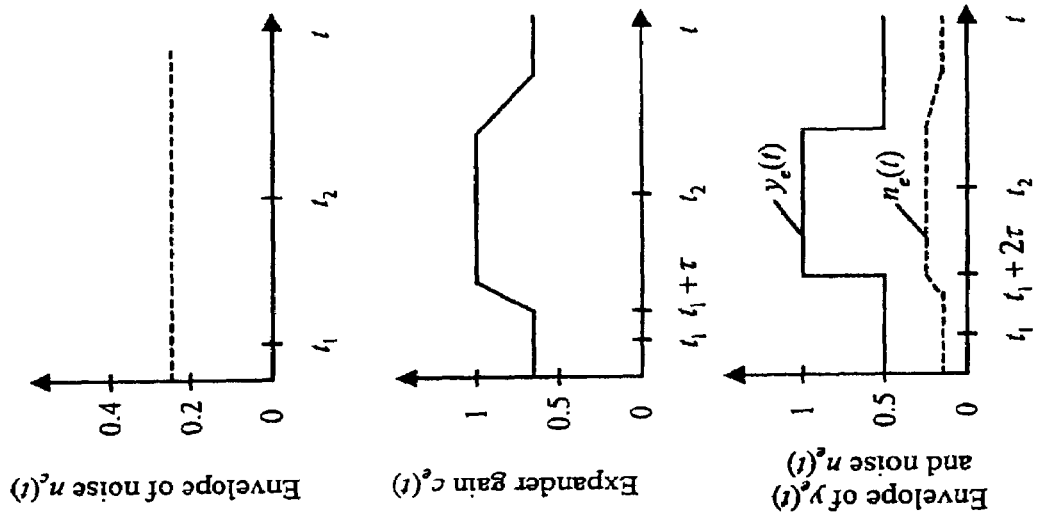
Fig. 2A Envelope of $d(t)$
Fig. 2B Compressor gain $c_c(t)$
Fig. 2C Envelope of $d_c(t)$
Fig. 2D Envelope of noise $n_e(t)$
Fig. 2E Expander gain $c_e(t)$
Fig. 2F Envelope of $y_e(t)$ and noise $n_e(t)$

METHOD FOR NOISE REDUCTION OF A FM SIGNAL

CROSS REFERENCE TO RELATED APPLICATIONS

This application claims the benefit of priority under 35 U.S.C. § 119(a)-(d) from European Patent Application 01 120 335.3, filed Aug. 24, 2001.

BACKGROUND OF THE INVENTION

1. Field of the Invention

The present invention is related to a method for noise reduction of a FM signal, in particular to such a method comprising the step of companding the difference signal of a FM signal and transmitting the compressed difference signal additionally within the (normally transmitted) FM signal.

2. Discussion of the Background

Companders are generally known. A compander compresses the difference signal_before the channel or storage medium and expands after the channel or storage medium. Therewith, audible noise distortions which are added to the transmitted or stored signal are reduced by such a compander. One of the best known companders for tape recording purposes is the Dolby-B-type noise reduction system. Such a syllable compander calculates the slowly varying envelope amplitude of the audio signal and compresses/ expands the audio signal according thereto. A detailed description of companders and in particular of the Dolby NR (Noise Reduction) system can be found under "http://www.dolby.com/ken".

Further, the usage of a compander for FM broadcast is also generally known. In this field a noise reduction of the difference signal noise is achieved by compressing the difference signal in the transmitter and transmitting the compressed difference signal additionally within the normally transmitted FM signal. According to Emil L. Torick and Thomas B. Keller "Improving the signal-to-noise ratio and coverage of FM stereophonic broadcasts", J. Audio Enc. Soc., Vol. 33, No. 12, New York, December 1985, pages 938-943, presented under the title "FMX Studio Broadcast System" at the 79th convention of the Audio Engineering Society, Oct. 12-16, 1985, the compressed difference signal is added to the in-quadrature component of the modulated 38 kHz carrier, i.e. the compressed difference signal is transmitted in quadrature to the uncompressed difference signal. Alternatively, DE 41 28 045 A1 describes to add the compressed difference signal to the lower sideband of the modulated 38 kHz carrier and to subtract the compressed difference signal from the upper sideband of the modulated 38 kHz carrier before transmission of the so modified multiplex signal. Both modulation systems are backward compatible to the existing FM-Standard. A mathematical analysis of both described modulation systems leads to the result that the modulation system described in DE 41 28 045 A1 leads to less distortions in conventional FM receivers than the modulation system described in Emil L. Torick and Thomas B. Keller.

Both companders are auxiliary controlled companders which are controlled by the conventional difference signal. The conventional difference signal is defined as the difference signal decoded by a conventional FM receiver, i.e. the DSB modulated difference signal. Both compressors do not exploit the availability of the auxiliary signal for the minimization of transient overshoots in the compander. Transient overshoots might lead to an overmodulation of the FM transmitter. This overmodulation is not allowed and must therefore be avoided.

SUMMARY OF THE INVENTION

Therefore, it is the object underlying the present invention to provide an improved companding method for noise reduction of a FM signal.

This object is achieved with the companding method defined in independent claims 1 or 3. A FM transmitter designed for said method, i.e. a FM transmitter according to the present invention, is defined in independent claims 4 and 9, and a FM receiver designed for said method, i.e. a FM receiver according to the present invention, is defined in independent claims 10 and 15. Preferred embodiments thereof are respectively defined in the respective following dependent subclaims. Computer program products according to the present invention are defined in claims 16 to 18.

Therewith, the method for noise reduction of an audio signal transmitted as a FM multiplex signal including a sum signal and a difference signal according to the present invention which comprises the step of companding the difference signal and transmitting the compressed difference signal additionally within the multiplex signal, wherein the compressor gain and/or the expander gain is controlled on basis of an auxiliary signal, is characterized by equalising a group delay linked to the generation of the compressor gain during generation of the multiplex signal, and equalising a group delay linked to the generation of the expander gain during generation of the sum signal and the expanded difference signal.

According to the present invention overshoots in the compressed difference signal which lead to distortions in the compressed difference signal in case of limiting said signal are minimized in comparison to the above described companding methods according to the prior art. The avoiding of transient overshoots in the compressed signal prevents an overmodulation in the transmitter.

Preferably, in the companding of the difference signal according to the present invention, the compressor gain and/or the expander gain is controlled on the basis of a combination of sum signal and the conventional difference signal of the FM signal, i.e. the compander is controlled by auxiliary signals.

The combination of the sum and the difference signal for the compander control which is proposed by the present invention leads to an improved left/right channel separation in case of bad reception situations, since the accuracy of the expanded signal is directly related to the left/right audio channel separation and the accuracy of the expanded difference signal is improved according to the present invention due to the fact that the sum signal contains less distortions than the difference signal.

Further, the FM transmitter and/or the FM receiver according to the present invention which respectively comprises a respective first delay element arranged in the signal path of the difference signal preceding the compressor and/or in the signal path of the compressed difference signal preceding the expander which introduces a group delay linked to the generation of the compressor/expander gain, i.e. which delays the respective input signal exactly the time which is needed for the generation of the compressor/ expander gain, should additionally comprise a second delay element arranged in the respective signal path of the sum signal to introduce a corresponding group delay.

Also, the FM transmitter and/or the FM receiver according to the present invention preferably additionally comprise(s) a respective control circuit receiving the sum-signal and the difference signal to set the compressor/expander gain on basis of a combination of both signals.

The FM transmitter and/or the FM receiver according to the present invention preferably realize a multiband companding, i.e the FM transmitter preferably comprises a multiband compressor compressing said difference signal on basis of subbands thereof and/or the FM receiver preferably comprises a multiband expander expanding a received compressed difference signal on basis of subbands thereof.

The method according to the present invention, the FM transmitter according to the present invention, and the FM receiver according to the present invention can respectively be embodied as a hardware circuit or in software, i.e. by computer program products as defined in claims 13 to 15.

Therewith, according to the present invention a syllable compander controlled by an auxiliary channel is designed which minimizes transient overshoots, since a respective group delay linked to the generation of the compressor/expander gains is equalized, and are—preferably—more reliable than the above described prior art companders, since preferably the sum signal and the difference signal are both used as auxiliary signals to control the compressor and/or expander.

Generally, to determine a respective influence of the sum signal and the difference signal it has to be considered that both signals have advantages and disadvantages for the controlling of the compander. The sum signal contains less distortions and generally more signal power than the difference signal. Therefore, the compander control using the sum signal results in a higher amplitude accuracy of the expanded difference signal compared to a compander control using only the difference signal. The higher accuracy of the expanded difference signal leads to an increased audio channel separation in difficult reception situations, as stated above. On the other hand, there exist audio signals, for example Dolby Pro Logic encoded multi-channel audio signals that contain a high difference signal amplitude in combination with a low sum signal amplitude. If the compander is controlled by the sum signal only, the difference signal is amplified in the compressor in case of no or few sum signal power. Depending on the difference signal amplitude, this leads to an overmodulation of the FM transmitter. These distortions are avoided by a compander control consisting of the combination of sum and difference signal.

Therefore, according to the present invention this concept of avoiding an overmodulation of the FM transmitter by determining the auxiliary signal on basis of a combination of sum and difference signal is claimed independently from the concept of avoiding an overmodulation of the FM transmitter by equalizing a respective group delay linked to the generation of the compressor/expander gain.

The present invention is further elucidated by the following description of an exemplary embodiment thereof taken in conjunction with the accompanying figures, wherein

BRIEF DESCRIPTION OF THE DRAWINGS

FIG. 1 shows a backward compatible broadband syllable compander for FM-broadcast according to the present invention, and FIG. 2 shows the transient characteristics of the compander shown in FIG. 1.

DETAILED DESCRIPTION OF THE PREFERRED EMBODIMENTS

FIG. 1a shows a simplified block diagram of a FM-multiplexer in combination with a broadband syllable compander according to the present invention. The audio signal of the left channel $a_l(t)$ and the audio signal for the right channel $a_r(t)$ are input to a matrix circuit 10 which outputs the sum signal s(t) and the difference signal d(t). In a conventional multiplexer the difference signal d(t) would be modulated and added to the sum signal s(t) to generate the multiplex signal m(t) to be transmitted. According to the present invention, the sum signal s(t) and the difference signal d(t) are input to a control circuit 1 which determines a compressor gain $c_c(t)$ with which the difference signal gets compressed by way of a multiplier 2. The control circuit 1 and the multiplier 2 build the compressor according to the present invention. The control circuit 1 has a certain group delay τ for the calculation of the compressor gain $c_c(t)$. Further, to avoid audible distortions resulting from a fast switching of the gain, an attack time should be considered in which the gain is slowly varied from a current level to a wanted level. Therefore, to avoid transient overshoots the delayed difference signal d(t−τ) gets compressed. To ensure that the correct difference signal is input to the multiplier 2 of the compressor a first delay element 3 with delay τ is arranged in the signal path of the difference signal d(t) preceding said multiplier 2 of the compressor. Of course, the control circuit 1 receives the undelayed difference signal d(t). The delayed difference signal d(t−τ) and the corresponding compressed difference signal $d_c(t)$ are input to a modulation circuit 11 which modulates both signals as it is described in the above referenced paper by Emil L. Torick and Thomas B. Keller or in DE 41 28 045A1, for example. The output signal of the modulator 11 is input to an adder 12 which adds thereto the correspondingly delayed sum signal s(t−τ) which is output by a second delay element 4 receiving the sum signal s(t) from the matrix circuit 10. The adder 12 outputs the multiplex signal m(t) generated according to the present invention.

FIG. 1b shows a demultiplexer in combination with a broadband syllable compander according to the present invention. The transmitted multiplex signal $u_m(t)$ is input to a lowpass filter 14 which outputs the transmitted sum signal $u_s(t)$ and is further input to a demodulation circuit 13 which outputs the transmitted difference signal $u_d(t)$ and the transmitted compressed difference signal $u_c(t)$. The transmitted sum signal $u_s(t)$ and the transmitted difference signal $u_d(t)$ are input to a control circuit 5 which calculates the expander gain $c_e(t)$. The calculation of the expander gain is again related to a group delay τ. Generally, the group delay to calculate the compressor gain and the group delay to calculate the expander gain are identical, since compressor and expander have the same characteristic. However, depending on the implementation different group delays might have to be compensated in the compressor and the expander. The expander gain $c_e(t)$ is input to a multiplier 6 of the expander which additionally receives the correspondingly delayed transmitted compressed difference signal $u_c(t-\tau)$ which is output by a third delay element 7 which receives the transmitted compressed difference signal $u_c(t)$ from the demodulator 13. The expanded delayed received compressed difference signal $u_e(t)$ output by the multiplier 6 of the expander is input to a matrix circuit 15 which additionally receives a correspondingly delayed transmitted sum signal $u_s(t-\tau)$ output by a fourth delay element 8 which receives the transmitted sum signal $u_s(t)$ from the lowpass filter 14 to output the left and right audio signals.

Since the group delay of the circuit for the generation of the compressor gain ($c_c$) and of the expander gain ($c_e$) is respectively equalized in the multiplexer/demultiplexer, the compander according to the present invention shown in FIG. 1 is optimal in terms of transient characteristics.

FIG. 2 shows the transient characteristics of the syllable compander with optimum transition characteristics according to the present invention. The envelope of the difference signal $d(t)$ is depicted in FIG. 2$a$. For the sake of simplicity the sum signal $s(t)$ is assumed to be 0, i.e. $s(t)=0$. In the time interval before t1 the envelope amplitude of the difference signal $d(t)$ is low and equals to 0.5. To mask the channel noise, the difference signal has to be amplified in the compressor. In the example shown in FIG. 2 the amplification, i.e. the compressor gain $c_c(t)$ is determined to 1.5 before t1. At the time t1 the envelope amplitude of the difference signal $d(t)$ is increasing from 0.5 to 1. The compressor control circuit 1 must reduce the amplification of the difference signal $d(t)$ to avoid a channel overload. A switching of the amplification at the time t1 from 1.5 to 1 would result in audible modulation distortions since the spectrum of a step function is infinite. The attack time $T_a>0$ of the envelope detection circuit included in the control circuit 1 results in a slowly decreasing compressor gain $c_c(t)$. To avoid transient overshoots of the compressed difference signal the compressor gain $c_c(t)$ is multiplied with the delayed difference signal $d(t-\tau)$. The resulting compressed difference signal $d_c(t)$ does not show transient overshoots, as it is depicted in FIG. 2$c$.

Similar to the slowly decreasing compressor gain in case the difference signal is increasing to avoid audible modulation distortions, the compressor gain has to be slowly increasing in case the difference signal is decreasing, as it is shown for the difference signal $d(t)$ at the time t2 where the envelope of the difference signal $d(t)$ changes from 1 to 0.5. Ideally, the compressor gain is held for a time $T_h$ before the compressor gain is increasing again with the decay time constant $T_d$.

For the sake of simplicity the envelope of the noise $n_c(t)$ added in the transmission channel which is depicted in FIG. 2$d$ is assumed to be constant at approximately 0.25. The expander gain $c_e(t)$ which is shown in FIG. 2$e$ is ideally the inverted delayed compressor gain $c_c(t)$ to get an overall amplification of the compressor/expander configuration of 1. The multiplication of the expander gain $c_e(t)$ with the delayed compressed difference signal $u_c(t-\tau)$ results in the expanded difference signal $u_e(t)=y_e(t)+n_e(t)$ which is shown in FIG. 2$f$, with $y_e$ being the received expanded compressed difference signal and $n_e$ being the expanded noise signal. The envelope of the expanded difference signal $y_e$ which is depicted in FIG. 2$f$ by a solid line is identical to the $2\tau$ delayed envelope of the difference signal $d(t-2\tau)$. The noise included in the difference signal which is depicted in FIG. 2$f$ by a dotted line is decreased for low envelope amplitudes of the difference signal.

In the time interval $t_1+\tau<t<t_1+2\tau$, the expanded noise $n_e$ is increasing but the envelope amplitude of the expanded difference signal $y_e$ is still low. The increasing noise is ideally masked by the pre-masking effect of the human auditory system. In a similar way the increased noise during the transition from a low to a high compressor gain is ideally masked by the post-masking effect.

The demodulator 13 corresponds to the modulator 11 and might be realized as indicated in the above referenced paper of Emil L. Torick and Thomas B. Keller or as shown in DE 41 28 045A1.

The present invention is directed to the control of the compander, i.e. to the generation of the compressor gain and/or of the expander gain. The exemplary embodiment shows a broadband syllable compander. However, the present invention is not limited to a broadband syllable compander, but also a compander might be used which divides the audio signal into subbands, e.g. with a bandwidth according to the critical bandwidth of the human auditory system, wherein each subband is processed individually to maximize the noise reduction effect and to minimize noise modulation effects. In this case, a respective compressor gain and/or expander gain is respectively calculated for every subband with the help of the respective subband sum signal and subband difference signal. Such a compander is shown in the Applicant's parallel European patent application "Linear Phase Compander for FM Broadcast" submitted on the same day as this application which content is herewith incorporated into this specification. Further, the companding method according to the present invention is described for FM broadcast. However, the present invention is also applicable to other companders with auxiliary control signals.

The invention claimed is:

1. A method for noise reduction of an audio signal transmitted as a FM multiplex signal including a sum signal and a difference signal, comprising:
   companding the difference signal and transmitting a compressed difference signal within a multiplex signal controlling a compressor gain and/or an expander gain based on an auxiliary signal;
   equalizing a group delay linked to a generation of the compressor gain during generation of the multiplex signal; and
   equalizing a group delay linked to a generation of the expander gain during generation of the sum signal and the expanded difference signal.

2. The method according to claim 1, wherein said auxiliary signal is a combination of the sum signal and difference signal.

3. A computer readable medium including computer executable instructions that cause a computer to implement the method according to claim 1.

4. A method for noise reduction of an audio signal transmitted as a FM multiplex signal including a sum signal and a difference signal, comprising:
   companding the difference signal and transmitting a compressed difference signal within the multiplex signal; and
   controlling a compressor gain and/or the expander gain on basis of a combination of the sum signal and the difference signal.

5. A FM transmitter, comprising:
   a compressor configured to compress a difference signal; and
   a first delay element arranged in a signal path of the difference signal preceding said compressor to introduce a group delay linked to a generation of a compressor gain.

6. A FM transmitter according to claim 5, further comprising:
   a second delay element arranged in a signal path of a sum signal to introduce a group delay linked to the generation of the compressor gain.

7. The FM transmitter according to claim 5, wherein said compressor comprises:
a control circuit configured to receive a sum signal and the difference signal to set the compressor gain on basis of a combination of both these signals.

8. The FM transmitter according to claim 7, wherein said compressor comprises:
a multiplier arranged in the signal path of the difference signal and connected to said control circuit to multiply the delayed difference signal with said compressor gain.

9. The FM transmitter according to claim 5, wherein said compressor is a multiband compressor compressing said difference signal on basis of subbands thereof.

10. A computer readable medium including computer executable instructions causing a computer to execute the functions of the FM transmitter according to claim 5.

11. A FM transmitter, comprising:
a compressor configured to compress a difference signal said compressor including
a control circuit configured to receive a sum signal (s(t)) and the difference signal to set a compressor gain on basis of a combination of both the sum and difference signals.

12. A FM receiver comprising:
an expander configured to expand a received compressed difference signal which is transmitted within a received FM signals; and
a first delay element arranged in a signal path of the compressed difference signal preceding said expander to introduce a group delay linked to a generation of an expander gain.

13. The FM receiver according to claim 12, further comprising:
a second delay element arranged in a signal path of the sum signal to introduce a group delay linked to the generation of the expander gain.

14. The FM receiver according to claim 12, wherein said expander comprises:
a control circuit configured to receive a sum signal and a difference signal of the received FM signal to set the expander gain on basis of a combination of both the sum and difference signals.

15. The FM receiver according to claim 14, wherein said expander comprises:
a multiplier arranged in the signal path of the compressed difference signal and connected to said control circuit to multiply the delayed compressed difference signal with said expander gain.

16. The FM receiver according to claim 12, wherein said expander is a multiband expander configured to expand a received compressed difference signal on basis of subbands thereof.

17. A computer readable medium including computer executable instructions causing a computer to execute the functions of the FM receiver according to claim 12.

18. A FM receiver, comprising:
an expander configured to expand a received compressed difference signal which is transmitted within a received FM signal, said expander including
a control circuit configured to receive a sum signal and a difference signal of the received FM signal to set an expander gain on basis of a combination of both the sum and difference signals.

* * * * *